United States Patent [19]
Armenoff et al.

[11] Patent Number: 6,029,342
[45] Date of Patent: Feb. 29, 2000

[54] APPARATUS KIT AND METHOD FOR ROLLER CHAIN ASSEMBLY

[75] Inventors: David C. Armenoff, Greenwood; David J. Frey, Indianapolis, both of Ind.

[73] Assignee: AMSTED Industries Incorporated, Chicago, Ill.

[21] Appl. No.: 08/925,556

[22] Filed: Sep. 8, 1997

[51] Int. Cl.$^7$ ..................................................... B21L 9/00
[52] U.S. Cl. .................................... 29/791; 29/783; 59/7; 59/35.1
[58] Field of Search .............................. 59/7, 8, 25, 35.1; 29/791, 795, 783

[56] References Cited

U.S. PATENT DOCUMENTS

| | | | |
|---|---|---|---|
| 1,546,393 | 7/1925 | Maisenbacher | 59/35.1 |
| 1,761,415 | 6/1930 | Speidel et al. | 59/35.1 |
| 3,722,062 | 3/1973 | Gharaibeh | 29/783 |
| 3,866,410 | 2/1975 | Zwinge | 59/7 |
| 4,573,262 | 3/1986 | Dornes et al. | 29/783 |
| 4,708,009 | 11/1987 | Post | 72/472 |

FOREIGN PATENT DOCUMENTS

| | | | |
|---|---|---|---|
| 1-103241 | 4/1989 | Japan | 29/795 |

*Primary Examiner*—David Jones
*Attorney, Agent, or Firm*—Edward J. Brosius; F. S. Gregorczyk; Stephen J. Manich

[57] ABSTRACT

An assembly apparatus, kit and method of making roller chain of different pitch are disclosed. The apparatus and kit include a main drive mechanism rotatable about its central longitudinal axis and a plurality of assembly stations. Each assembly station has a movable assembly mechanism to act on a workpiece and a drive train to move the assembly mechanism in response to rotation of the main drive mechanism. Each assembly station has a drive shaft substantially perpendicular to the main drive mechanism axis. One of the assembly stations is movable in a direction parallel to the main drive mechanism axis between a plurality of positions to vary the distance between the assembly stations without disconnecting the connection between the drive train and the main drive mechanism. Each assembly station has a locator unit for moving a workpiece. The locator units have workpiece supports to provide a continuous path between assembly stations. One of the locator units may be removable and a removable alternate locator unit may be provided with a workpiece support sized and shaped to abut the adjacent workpiece support to provide a continuous support path when the assembly stations are at a second spacing. A mechanism may be provided for moving the assembly station to the desired position. In the method, one of the assembly stations is moved to space the assembly stations at a first predetermined spacing by sliding a part of the drive train of one of the assembly stations in a direction parallel to the central longitudinal axis of the main drive mechanism. The appropriate locator units are then selected and secured to the assembly stations.

27 Claims, 6 Drawing Sheets

APPARATUS KIT AND METHOD FOR ROLLER CHAIN ASSEMBLY

FIELD OF THE INVENTION

The present invention relates to the assembly of products requiring multiple assembly stations. More particularly, the present invention relates to equipment and methods for the assembly of roller chain and roller link products.

BACKGROUND OF THE INVENTION

Many assembled products require that different parts be assembled together at a plurality of work or assembly stations in a production line. One example of such a product is roller chain, where the various components of the chain are added one piece at a time, and then pressed together, for example, to assemble the complete chain. Many of such products are made in different sizes for different end uses. For example, different roller chains may have a variety of pitches, that is, the distance between the centerlines of adjacent rollers, calling for different lengths of top, bottom and link plates. The distance between the pressing mechanisms relates to the pitch of the chain. With different pitches and lengths of link plates, it is necessary that the different pressing mechanisms be spaced apart at specific distances varying with the product. Thus, in a typical manufacturing operation, several assembly lines had to be designed to accept different tooling. Thus, in a typical assembly operation, several assembly lines were needed to make different products, or the stations had to be designed to accept different tooling. However, since the pressing mechanisms had to be spaced apart at different distances, the tooling had to be designed with various offsets to account for the different sizes of components to accommodate the different train stack-up. In such offset tooling, one work station support would be used with replaceable tooling. The replaceable tooling included a vertically-operating press equipment and a horizontally operating slide. Depending on the pitch of the chain, the vertical press could operate in a plane offset from the vertical center plane of the work station support, resulting in unbalanced loads being placed on the work station support. Another alternative was to provide for additional track to be incorporated between the stations, such as curved track, and to use the variable track length to allow for more efficient production. Problems could arise in using both of these solutions: using offset tooling creates off-center loading during pressing of the components and off-center loading can lead to wear and premature failure of the work station support; adding curved track not only adds to the expense of the operation, but also creates potential operating problems in feeding the parts through the curved track sections.

SUMMARY OF THE INVENTION

One object of the present invention is to provide for efficient production of a variety of products on a single production line. The present invention provides a solution to the problem of using an existing set of assembly stations for more than one size of component in an assembly operation. The present invention addresses the need for variable spacing between assembly operations by providing movable work or assembly stations, so that the work stations can be positioned at optimal distances for the type of product being manufactured, for balanced loading at the work station, and for improved efficiency in changing over from the assembly of one product to the assembly of another. The present invention provides a design for changing the spacing between stations on roller chain and roller link assembly machines to permit assembly of various size roller chains and components on the same machine.

In one aspect, the present invention provides an assembly apparatus for assembling a product from workpieces. The apparatus includes a main drive mechanism having a central longitudinal axis. The main drive mechanism is rotatable about its central longitudinal axis. The apparatus also includes a first assembly station. The first assembly station comprises a movable assembly mechanism to act on a workpiece and a drive train between the moveable assembly mechanism and the main drive mechanism for moving the assembly mechanism in response to rotation of the main drive mechanism. The drive train includes an assembly station drive shaft having a central longitudinal axis substantially perpendicular to the central longitudinal axis of the main drive mechanism and means for rotating the assembly station drive shaft with rotation of the main drive mechanism. The apparatus also includes a second assembly station spaced from the first assembly station and comprising a movable assembly mechanism to act on a workpiece received from the first assembly station and a drive train between the movable assembly mechanism and the main drive mechanism for driving the assembly mechanism in response to rotation of the main drive mechanism. The first assembly station is movable with respect to the second assembly station in a direction parallel to the main drive mechanism central longitudinal axis between a plurality of positions. Each position of the first assembly station is at a different spacing from the second assembly station to vary the distance between the assembly stations.

In another aspect, the present invention provides an assembly system kit capable of assembling more than one product. The kit comprises a main drive mechanism having a central longitudinal axis and being rotatable about its central longitudinal axis and a first assembly station. The first assembly station comprises a ram movable in a predetermined path for applying force to a workpiece, and a first assembly station locator unit having a locator member for moving a workpiece element toward the path of the ram and a workpiece support of one length. A first assembly station drive shaft has a central longitudinal axis substantially perpendicular to the central longitudinal axis of the main drive mechanism. Means are provided for rotating the first assembly station drive shaft with rotation of the main drive mechanism so that the rotational position of the assembly station drive shaft varies with the rotational position of the main drive mechanism. A drive linkage is between the first assembly station drive shaft and the ram to move the ram with rotation of the first assembly station drive shaft. A drive linkage extends from the first assembly station drive shaft to move the locator member with rotation of the assembly station drive shaft. The kit also includes a second assembly station spaced from the first assembly station to receive the workpiece from the first assembly station. The second assembly station comprises a ram movable in a predetermined path for applying force to a workpiece and a second assembly station locator unit having a locator member for moving a workpiece element toward the path of the ram and a workpiece support of one length. A second assembly station drive shaft has a central longitudinal axis substantially perpendicular to the central longitudinal axis of the main drive mechanism. Means are provided for rotating the second assembly station drive shaft with rotation of the main drive mechanism so that the rotational position of the second assembly station drive shaft varies with the rotational position of the main drive mechanism. A drive linkage is between the second assembly station drive shaft and the ram to move the ram with rotation of the second assembly station drive shaft. A drive linkage extends from the second assembly station drive shaft to move the locator member with rotation of the second assembly station drive shaft. The first assembly station is movable with respect to the second assembly station to a plurality of positions at different distances from the second assembly station. At a first position, the second assembly station workpiece support abuts the first assembly station workpiece support to provide a continuous support path for the workpiece between the first assembly station and the second assembly station. At least one of the locator units is removable from the associated assembly station. The kit further includes an alternate locator unit interchangeable with the removable locator unit on the assembly station. The alternate locator unit has a workpiece support sized and shaped to abut the adjacent locator unit workpiece support to provide a continuous support path for the workpiece between the two assembly stations when one of the assembly stations is at another position with a different distance between the assembly stations.

In another aspect, the present invention provides an assembly apparatus for combining workpiece elements into a product comprising a first assembly station including a movable assembly mechanism to act on a workpiece element and a second assembly station spaced from the first assembly station. The second assembly station has a movable assembly mechanism to act on a workpiece element received from the first assembly station. Means are provided for changing the spacing between the two assembly stations to position the assembly stations at predetermined distances from one another.

In another aspect, the present invention provides a method of assembling a product having a pitch. The method comprises the steps of providing first and second assembly stations, each assembly station including an assembly mechanism and a drive train for driving the assembly mechanism. A main drive mechanism is provided for both assembly stations. The main drive mechanism has a central longitudinal axis and is rotatable about the central longitudinal axis. Each assembly station drive train is connected to be driven by the main drive mechanism. The first and second assembly stations are positioned at a predetermined spacing from each other by moving a part of the drive train of one of the assembly stations in a direction parallel to the central longitudinal axis of the main drive mechanism.

DETAILED DESCRIPTION

As shown in the accompanying drawings, the present invention provides a product assembler apparatus 10, which may be part of a kit with interchangeable parts for use in making a variety of products. The kit or assembler 10 may be used in a novel method as described below.

The illustrated product assembler apparatus 10 is a press assembly system, and may be useful in the assembly of a roller chain product. A roller chain assembler will have a plurality of assembly stations 12, 14, 16, shown in FIGS. 14, each assembly station having a single press system, with the individual stations arranged serially on a planar base 17 for assembling different parts of a particular chain product. First, second and third assembly stations 12, 14, 16 are shown in FIGS. 14, but it should be understood that fewer or more stations could be provided, and the principles of the present invention may be applied to assemblers with fewer or more stations.

Figure 6:
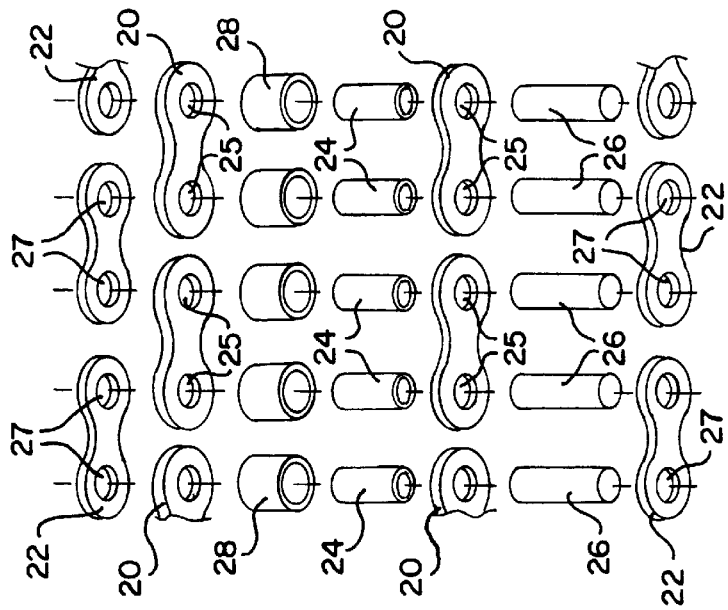
FIG. 6 is an exploded view of part of a roller chain that can be made on the apparatus of the present invention.

A typical roller chain 18 that may be assembled with such equipment is shown in an exploded view in FIG. 6, and typically has a plurality of roller link plates 20 joined together by pin link plates 22. Each roller link plate 20 has a pair of bushings 24 press fit into holes 25 in the roller link plate 20, and each pin link plate 22 has a pair of pins 26 press fit into holes 27 in the pin link plate 22. Each roller link plate 20 is pivotally connected to two adjoining pin link plates 22 with one pin 26 from each of the adjoining pin link plates 22 extending through one of the roller link plate bushings 24. Rollers 28 are mounted for rotation on the bushings 24. Such roller chain products 18 are useful in power transmission, and are usually load-bearing in operation. A variety of sizes and shapes of roller chain are made and used, and the different chains may have linkplates 20 with different contours, and the chains may have different pitches, measured as the distance in inches between the centerlines of the adjacent joint members, such as the distance between the centerlines of adjacent pins 26. As the pitch of the chain varies, the distances between the press mechanisms of adjacent assembly stations 12 in the assembler 10 will also vary.

The assembler apparatus 10 could comprise a roller link assembler apparatus, with the first assembly station 12 comprising a bush link assembly station, for pressing the bushings 24 into the roller link plates 20, the second assembly station 14 comprising a roller assembly station for placing the rollers 28 on the bushings, and the third assembly station 16 comprising an upper linkplate assembly station for pressing the upper roller link plate 20 onto the bushings 24 to assemble a complete roller link. The assembler 10 could also comprise a roller chain assembler apparatus, with the first station 12 comprising a pin link assembly station for pressing pins 26 into holes in a pin link plate 22, the second assembly station 14 comprising a roller link assembly station for placing a complete roller link on the adjacent pins 26 of adjacent pin link plates 22, and the third assembly station 16 could comprise a coverplate assembly station for pressing the covering pin linkplate 22 to complete the roller chain.

The illustrated assembler apparatus 10 includes a main drive mechanism 40 having a central longitudinal axis 42.

The main drive mechanism 40 is rotatable about its central longitudinal axis 42, and is driven by a clutch 44 which is driven by a flywheel 46. The flywheel 46 is rotated by a drive belt 48 connected to a gear 50 that is rotated by a motor 52. This means for rotating the main drive mechanism 40 is shown and described for purposes of illustration only; it should be understood that other devices and linkages may be used for rotation the main drive mechanism 40.

Figure 4:
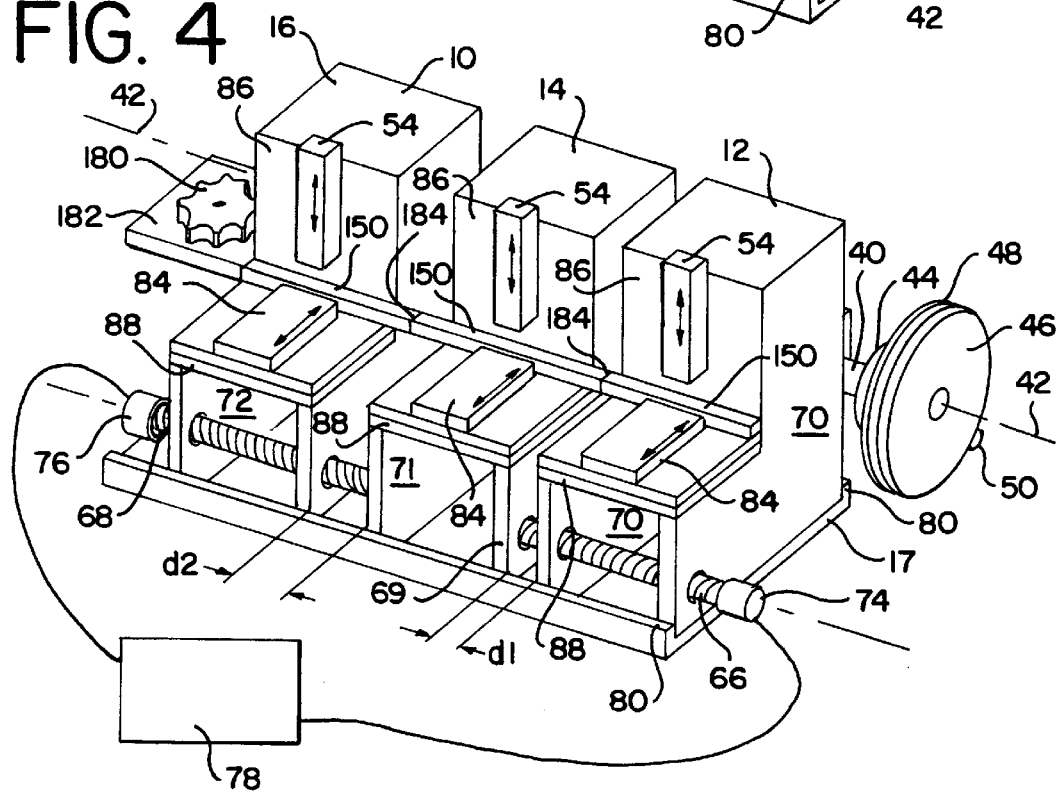
FIG. 4 is a schematic of the front of an assembler apparatus in perspective.

Each assembly station 12, 14, 16 in the illustrated assembler 10 includes a movable assembly mechanism 54 to act on a workpiece and a drive train 56 between the moveable assembly mechanism and the main drive mechanism 40 for moving the assembly mechanism in response to rotation of the main drive mechanism 40. In the illustrated embodiment, the first assembly station 12 and third assembly station 16 are movable on the planar base 17 in a direction parallel to the main drive mechanism central longitudinal axis 42 between a plurality of positions. In the illustrated embodiment, the position of the second assembly station 14 is fixed on the base. Each position of the first assembly station 12 and third assembly station 16 is at a different spacing from the second assembly station to vary the distances d1 and d2 as shown in FIG. 4 between the assembly stations 12, 14, 16 without disconnecting the main drive mechanism 40.

Each movable assembly 54 operates on one or more workpieces. In the case of an assembler apparatus used to assemble roller chain or a roller link of the type shown in FIG. 6, the workpieces may comprise the roller link plates 20, the pin link plates 22, the bushings 24, the pins 26 or the rollers 28. Other workpieces would be used for assemblers making other products.

Figure 5:
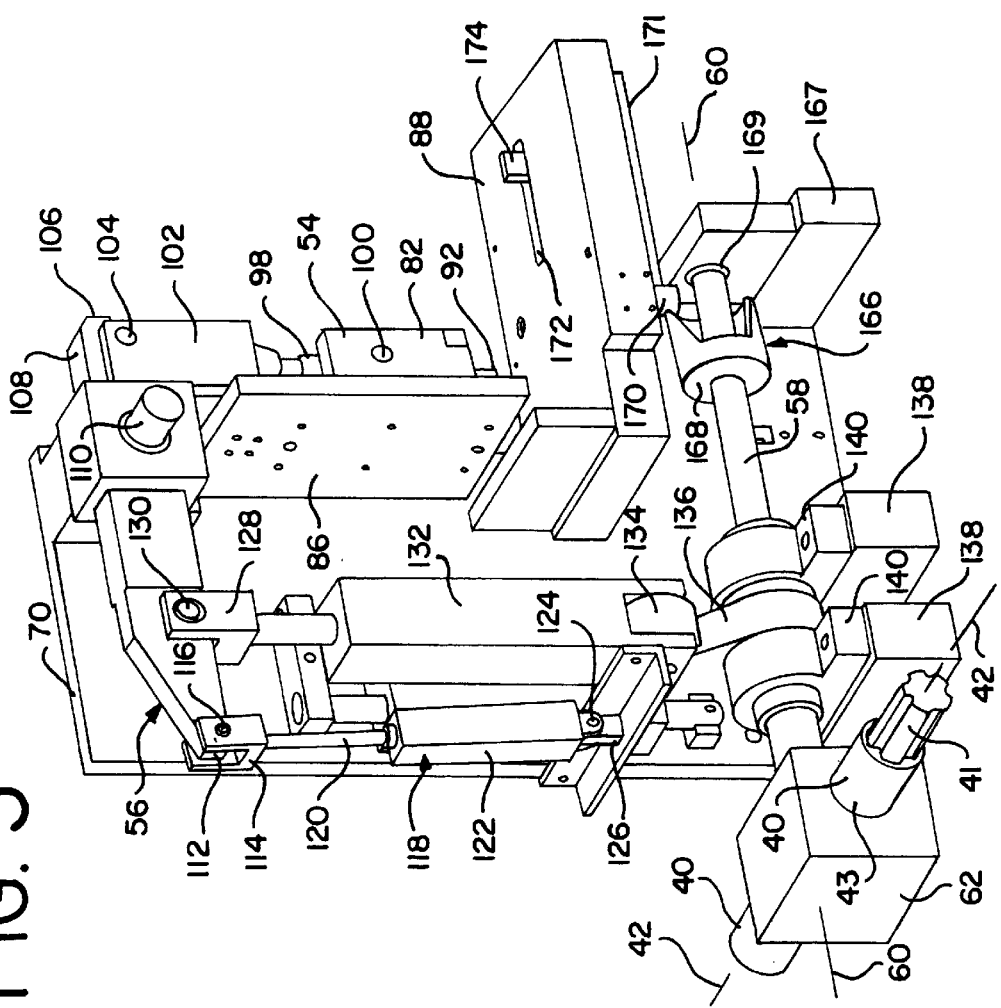
FIG. 5 is a perspective view of one assembly station that may be used with the assembler apparatus of the present invention, with parts removed from clarity.

As shown in FIG. 5, each illustrated drive train 56 includes an assembly station drive shaft 58 having a central longitudinal axis 60 that is substantially perpendicular to the central longitudinal axis 42 of the main drive mechanism 40. Each drive train 56 also includes means for rotating the assembly station drive shaft 58 with rotation of the main drive mechanism 40. The means for rotating may comprise a gear box 62, or any conventional bevel gear apparatus. A suitable right angle gear box for use with the present invention is available from the Boston Gear Division of Quincy, Mass., of IMO Industries, Inc. of Lawrenceville, N.J., Model No. R1515, with an overhung load (no thrust) of 1300 pounds and 1.5 inches from the end of the shaft, and a stock gear ratio of 1:1, 1.35:1 or 1.5:1. It should be understood that this right angle gear box is identified for purposes of illustration only, and that other gear boxes and right angle drives may be used to rotate the assembly station drive shaft 58 with the rotation of the main drive mechanism 40.

Figure 2:
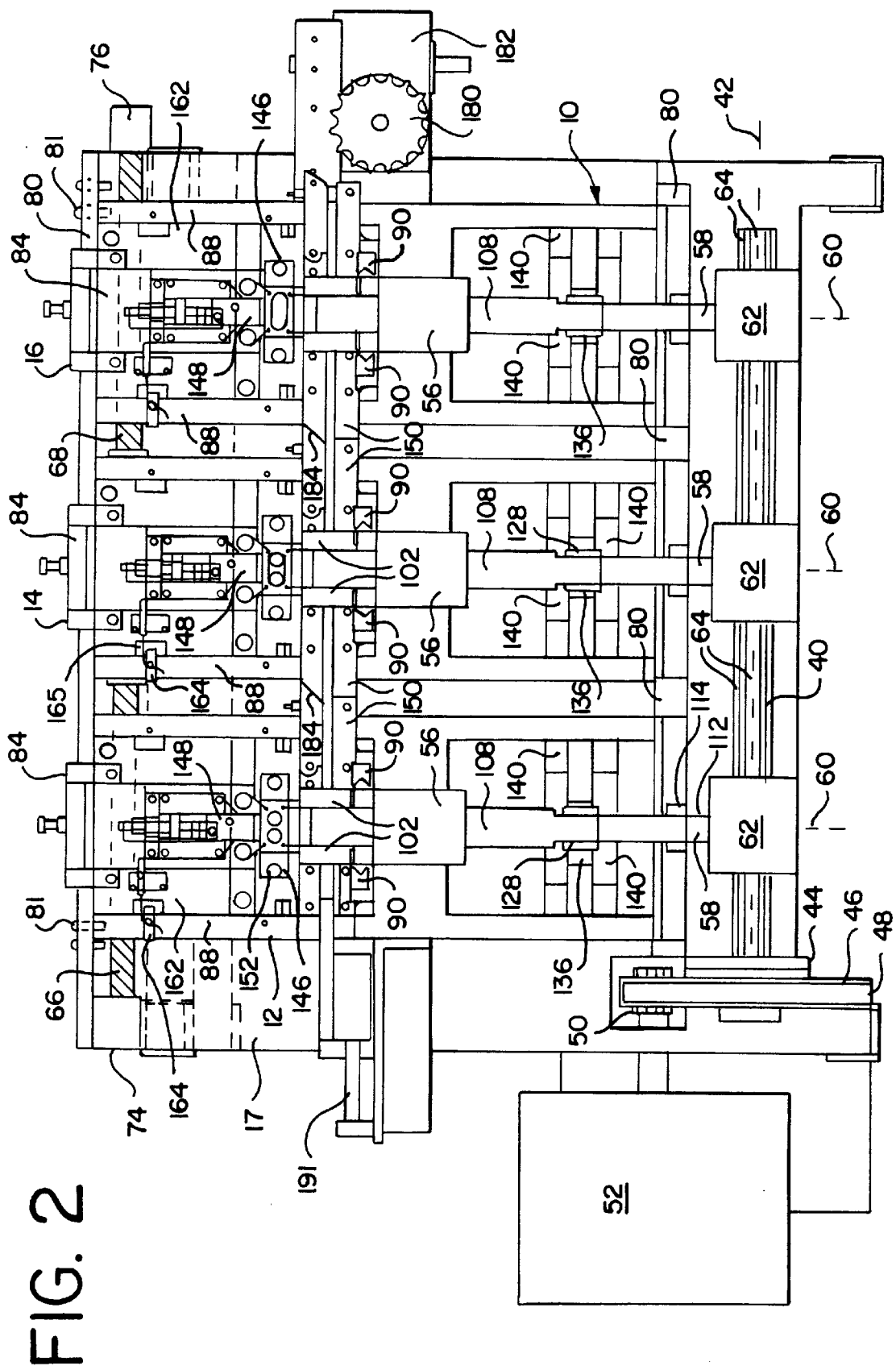
FIG. 2 is a top plan view of an assembler apparatus in accordance with the principles of the present invention, with parts removed for purposes of illustration, and showing a set of locator units in place at each assembly station that would be appropriate for assembling a roller link for later assembly into a roller chain.

As shown in FIG. 2, the first illustrated main drive mechanism 40 has a plurality of axial splines 64. The first illustrated main drive mechanism 40 is a common drive shaft, and extends from the clutch 44 to an end past the third assembly station 16. The axial splines 64 may extend the length of the common drive shaft or may be provided in the area of one or more of the assembly stations 12, 14, 16. In the embodiment illustrated in FIG. 2, the common drive shaft 40 extends through each gear box 62 and each gear box 62 is mounted on the splines 64 of the shaft 40 so that the rotating splines contact and turn the gears in the gear box. Each gear box 62 is slidable on the splines in a direction parallel to the central longitudinal axis 42 of the common drive shaft 40 so that the positions of the first and third assembly stations 12, 16 can be changed: the gear box for the first and third assembly station can be slid on the main drive mechanism as the assembly stations move without disconnecting the gear boxes 62, without changing any of the gears for driving the assembly station drive shaft 58, and without moving the common drive shaft. Thus, rotation of each assembly station drive shaft 58 is tied to rotation of the main drive mechanism 40, so that the timing of the operation of each assembly station 12, 14, 16 may be coordinated. The splines 64 in the vicinity of each assembly station are long enough to allow for the gear box to be moved to the extreme positions. It should be understood that one or all of the assembly stations could be made to be movable along the main drive mechanism.

Figure 3:
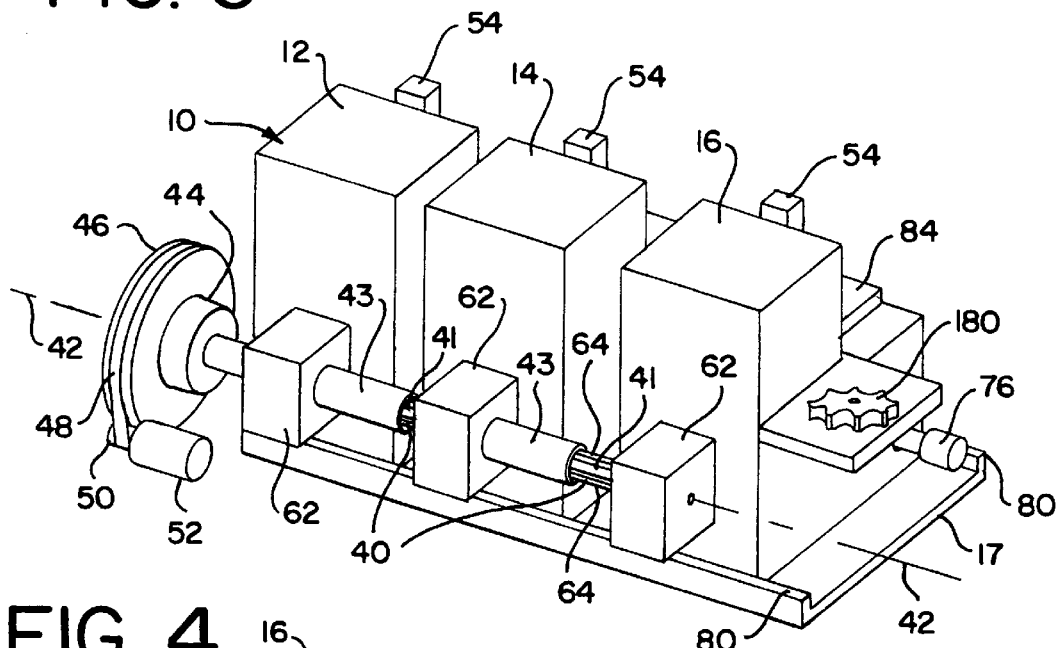
FIG. 3 is a schematic of the back of an assembler apparatus in perspective.

An alternative form of main drive mechanism 40 is shown in FIGS. 3 and 5. As there shown, the main drive mechanism 40 may comprise a plurality of discrete splined shaft segments 41 received within mating sleeves 43. The interiors of the sleeves are splined so that the sleeves and splined shaft segments rotate as one. The sleeves 43 are attached to drive the gears in the gear boxes 62, and to move the gear boxes with the movement of at least one adjacent sleeve. The splined shaft segments 41 may slide into and out of the receiving sleeves 43, to allow the relative positions of the adjacent assembly stations to be changed without disconnecting the gear boxes 62. The splined shaft segments 41 and sleeves 43 have a common central longitudinal axis 42 about which all rotate. As used herein, the phrase "main drive mechanism" is intended to include both the common drive shaft illustrated in FIG. 2 and the combination of splined shaft segments 41 and sleeves 43 illustrated in FIGS. 3 and 5. It should be understood that other structures may also be used for the main drive mechanism, such as a splined yoke, and are intended to be included within that phrase. Moreover, it should be understood that structures other than splines may be used.

Figure 1:
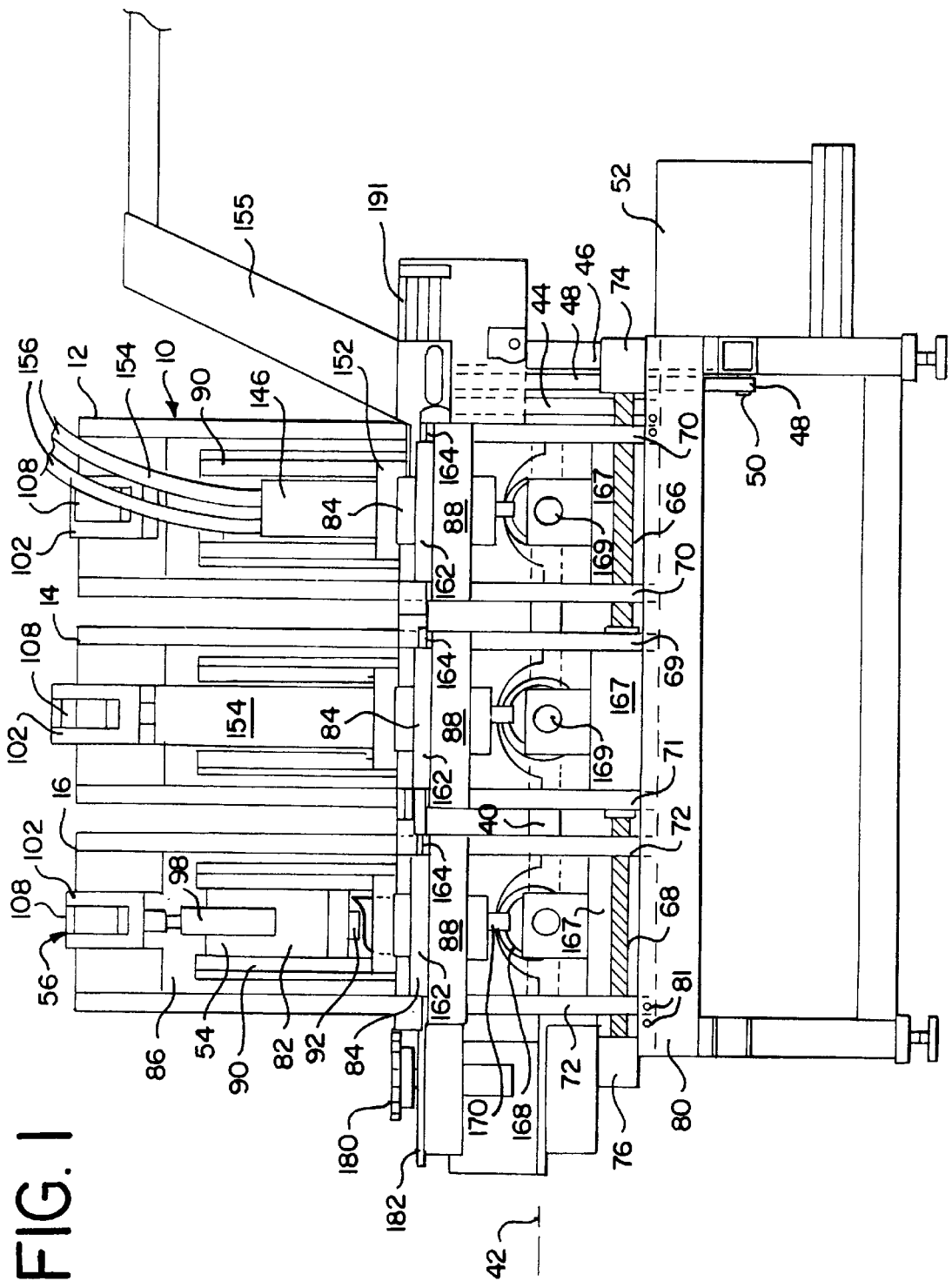
FIG. 1 is a front elevation of an assembler apparatus in accordance with the principles of the present invention.

In the illustrated embodiment, as shown in FIGS. 1–2, means for changing the spacing between the first and second 12, 14 and means for changing the spacing between second and third 14, 16 assembly stations are provided. The illustrated means for changing the spacing comprise a first threaded member 66 and a second threaded member 68. The first threaded member 66 extends between the first and second assembly stations 12, 14, from a connection to a vertical side frame member 69 of the stationary second assembly station 14, through two spaced vertical side frame 70 members to the exterior of the first assembly station 12. The second threaded member 68 extends between the second and third assembly stations, from a connection to another vertical side frame member 71 of the second assembly station 14 through two spaced vertical side frame members 72 to the exterior of the third assembly station 16. Suitable fittings may be provided around the threaded members 66, 68 on the first and third assembly stations 12, 16 so that as the first threaded member 66 is turned, the first assembly station moves closer to or further from the second assembly station to change the spacing between the stations and so that as the second threaded member 68 is turned, the third assembly station moves closer to or further from the second assembly station 14 to change the spacing between the second and third assembly stations. Each of the illustrated threaded members 66, 68 comprises a lead screw device, and commercially available lead screw devices may be used; for example, the types of lead screws typically used on lathes could be used.

The lead screws 66, 68 in the illustrated embodiment are each operated by a separate motor 74, 76. As shown schematically in FIG. 4, each motor 74, 76 can be connected to be controlled by a computer or other programmable control element 78 so that the optimum position for each assembly station for each product can be stored in the computer memory and translated into controlled rotation of each lead screw 66, 68 to easily and efficiently position the assembly stations 12, 16. An example of such a computer element is SLC 500 available from the Allen-Bradley Co., of Milwaukee, Wis. Other systems for controlled linear movement of the assembly stations may be employed and are with the scope of the invention. It should be understood that the lead screws could also be manually operated, and that in some embodiments it may be desirable to not use such lead screws.

To facilitate controlled linear movement of the first and second assembly stations 12, 16 on the base 17, the illustrated assembler 10 includes a set of guide rails 80 that prevent twisting or vertical movement of the assembly stations 12, 16 on the base, as shown in FIGS. 1–4. The guide rails 80 and movable assembly stations 12, 16 could have bearings at their interfaces to facilitate sliding movement of the assembly stations, and the movable assembly stations 12, 16 could have bearings or some other device for rolling movement along the surface of the base 17. The illustrated guide rails 80 are illustrated as extending over the front of each assembly station to maintain co-linear paths of travel for the movable assembly stations 12, 16. Other systems for controlled movement of the assembly stations 12, 16 can be used. For example, long rods or beams could be used for the base and the assembly stations could be mounted on bearing blocks on the rods or beams for support and guided movement. It should be understood that these systems are identified for purposes of illustration only, and other systems may be used.

It may be desirable to employ stops in the base structure for positioning of the assembly stations on the base. For such stops, it may be desirable to use complementary spring-biased shot pins 81 and holes or depressions associated with the base 17 or guide rails 80 and the movable assembly stations 12, 16, one of the complementary members being positioned on the base at each desired location for the assembly stations to endure proper positioning of the assembly stations. Whether the holes are in the base or the assembly stations, and which element should carry the shot pins are a matter of design choice. Other manual or automatic locking devices may be used to lock the assembly stations in each of their positions. In the motorized embodiment, the positions of the movable assembly stations 12, 16 could also be locked through the control of the motor 74; in a computer controlled embodiment, the computer 78 may control the motor 74 to prevent relative movement of the assembly stations or to control a mechanical locking mechanism.

In the illustrated embodiment, the movable assembly mechanism 54 of each assembly station 12, 14, 16 comprises a ram 82 movable through a pre-determined vertical path for applying a force to the workpiece. Each illustrated assembly station 12, 14, 16 also includes a locator unit 84 for moving workpiece elements horizontally into the path of the ram 82. The movable assembly mechanisms 54 and locator units 84 are shown schematically in FIGS. 3–4, and examples of suitable structures for rams 82 and locator units 84 are illustrated in FIGS. 2, 5 and 7–8.

A typical assembly station is shown in FIG. 5, and it should be understood that the structures shown in FIG. 5 may be used in each assembly station 12, 14, 16. Each illustrated assembly station 12, 14, 16 has a vertical frame member 86 perpendicular to the spaced side vertical frame members 69, 70, 71, 72. Each of the spaced vertical side frame members 69, 70, 71, 72 is L-shaped, and each assembly station has a horizontal frame member 88 that extends over and between each of the spaced vertical members adjacent the vertical frame member 86. As shown in FIG. 1, the illustrated vertical frame members 86 each carry a pair of spaced linear bearings 90 to guide the movement of the ram 82 in a vertical linear path. The lower end of each ram 82 has a hammer 92 for contacting the workpieces. As shown in FIGS. 1–4, each ram 82 has a path of movement that is substantially centered on the assembly station frame so that the load applied by the ram is centered on the frame. In the present invention, since the entire movable assembly station 12, 16, including the frame, moves as a unit, the vertical path of travel of each ram 82 does not change with any change in position of the assembly station, and it is not necessary to employ an offset ram to adjust spacing.

Each assembly station 12, 14, 16 has a similar drive train 56 extending between the ram 82 or movable assembly mechanism 54 and the drive shaft 58 for that assembly station. A typical drive train that may be used is illustrated in FIG. 5, and it should be understood that such a drive train may be used for all three assembly stations. As shown in FIG. 5, the ram 82 is connected to a rod 98 through a pivotal connecting pin 100. The opposite end of the rod 98 is connected to a clevis 102 that is connected through a clevis pin 104 to the front end 106 of a ram lever 108. Pivoting is permitted between the clevis pin 104 and the ram lever 108, and one or more bearings may be used to facilitate pivoting.

The illustrated ram levers 108 are pivotally mounted on the assembly station vertical side frame members 69, 70, 71, 72 at pivots 110. The pivots 110 for the ram levers 108 may comprise pins and may have one or more bearings to permit free pivoting of the ram lever 108. The pivots 110 are between the front ends 106 of the ram levers 108 and the back ends 112 of the ram levers. The back ends 112 of the illustrated ram levers 108 are each pivotally connected to an air spring clevis 114 through an air spring clevis pin 116 so that the ram lever 108 can pivot with respect to the clevis 114. Each air spring clevis 114 is connected to the top end of an air spring assembly 118 comprising an air spring rod 120 telescopically received in an air spring barrel 122. The bottom end of the air spring barrel 122 is mounted through a pin 124 to a frame fixture 126; the bottom end of the air spring is free to pivot about the frame fixture but vertical movement is limited.

In the embodiment illustrated in FIG. 5, between the pivot 110 and the connection to the air spring clevis 114 at the back end 112 of the ram lever 108, the ram lever 108 is pivotally connected to a top end of a clevis 128 through a clevis pin 130. The clevis 128 is connected through a rod to a cam follower assembly including a block 132 and a cam follower roller 134.

Each assembly station drive train 56 also includes a rotatable cam 136. Each cam follower roller 134 bears against the rotatable cam 136 for that station. Each rotatable cam 136 is mounted on the drive shaft 58 for that assembly station. The rotatable cam 136 is mounted to rotate with rotation of the drive shaft. Suitable supports 138 and bearings 140 may be provided for the assembly station drive shaft 58 and rotatable cam 136.

As shown in FIGS. 1–2 and 7–8, each illustrated locator unit 84 includes a workpiece feed assembly 146, a locator member 148 for moving a workpiece element toward the path of the ram 82, and a workpiece support 150. Each illustrated workpiece feed assembly 146 includes a bridge 152 spanning the horizontal path of the locator member 148 and a workpiece supply line 154 supported by the bridge 152. The type of workpiece supply line 154 varies with the workpiece being supplied. It may comprise a pair or tubes 156 as in the first assembly station 12 shown in FIG. 1 for delivering pins 26 or rollers 28 or bushings 24 to the locator member 154; it may comprise a stack of link plates 20, 22 to be supplied to the locator member, as shown in the second assembly station 14 of FIG. 1. An additional supply line 155 may be provided to supply a base link plate to the first assembly station 12, as shown in FIG. 1.

Figure 7:
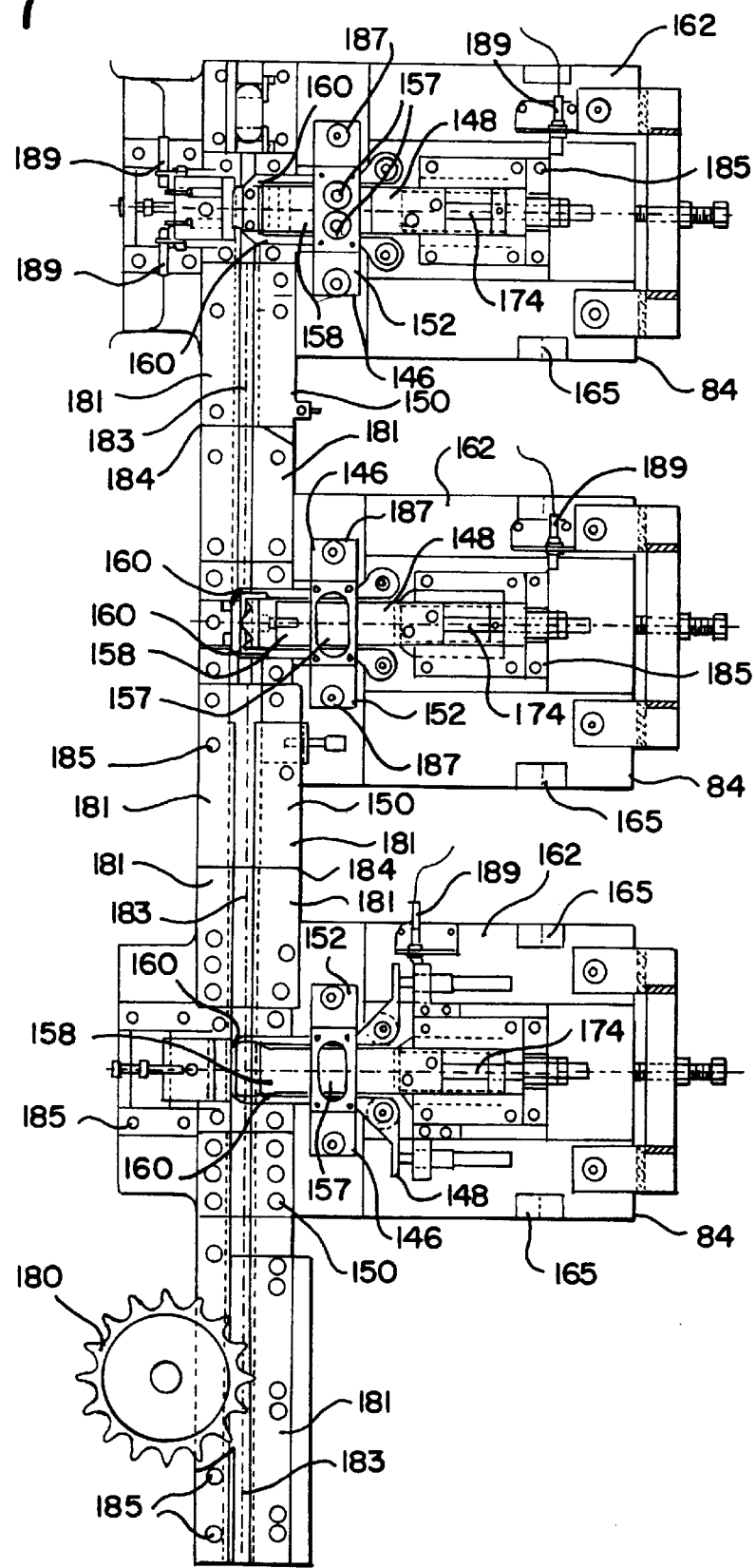
FIG. 7 is a top plan view of three locator units that may be used to assemble a complete roller chain.
Figure 8:
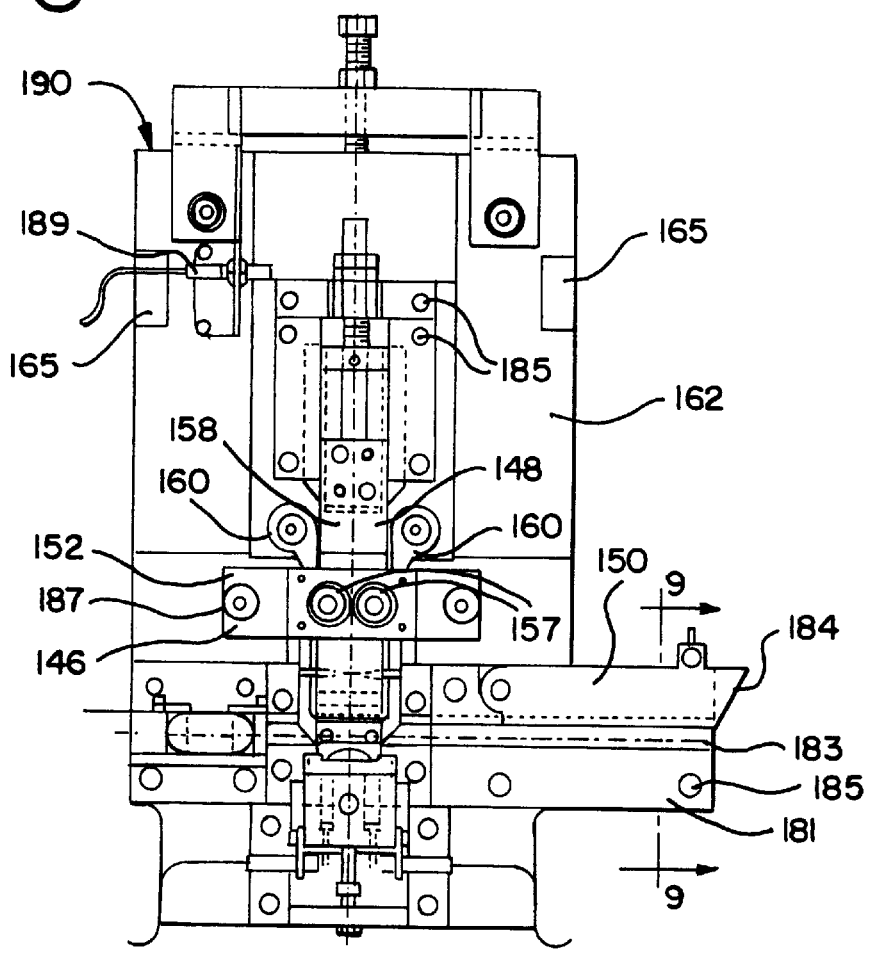
FIG. 8 is a top plan view of an alternative locator unit that may be interchanged with one of the locator units of FIG. 7, with a longer workpiece support.

As shown in FIGS. 7–8, where the supply lines 154 are removed for purposes of illustration, the bridges 152 have holes 157 generally corresponding in size and shape with the workpieces to be fed. The bridges and supply lines may be made to be removable from the locator units.

Each illustrated locator member 148 includes a workpiece pusher 158 between two locator arms 160. Each pusher 158 and set of locator arms 160 are shaped to push the workpiece element received through the holes in the bridge toward the path of the ram 82, and the locator arms 160 are shaped to hold the elements in position as the hammer 92 is applied to the workpieces.

Each illustrated locator unit 84 has a base 162 supported on the flat horizontal frame member 88 of each assembly station, and may be fixed to the frame member with any suitable clamp 164 or the like that allows the locator unit 84 to be easily removed when desired. The base 162 may have a recess 165 to receive a part of the clamp 164 fixed to the frame member 88. The base 162 may be shaped to define a path of travel for the pusher 158 and locator arms 160, or may carry a linear bearing to guide these elements.

Each assembly station has a drive linkage 166 extending from the drive shaft for that assembly station to move the locator member with rotation of the assembly station drive shaft. A typical drive linkage that may be used is illustrated in FIG. 5 and includes a barrel cam 168 mounted for rotation on the assembly station drive shaft 58. The barrel cam 168 has a cam surface that bears against a cam follower 170. The cam follower 170 is mounted on a trolley 171 on the underside of the horizontal frame member 88, and is biased toward the ram 82 by an air spring or the like on the trolley 171. The horizontal frame member 88 has a slot 172 extending through it, and a drive lug 174 is connected to the cam follower 170 through the slot. Thus, as the barrel cam 168 is rotated by the assembly station drive shaft 58, the cam follower 170 moves the drive lug 174 so that the locator member 148 may be moved toward or away from the ram 82 by the action of the spring, cam, cam follower and drive lug. As shown in FIG. 5, forward of the barrel cam 168, the assembly station drive shaft 58 is supported by a support member 167 and bearing 169.

At each assembly station, the supports 138, 167 and bearings 140, 169 are fixed to the vertical side frame members 69, 70, 71, 72 of each assembly station 12, 14, 16 so that each ram 82, drive shaft 58, right angle gear box 62 and both drive trains 94, 166 move with the assembly station as a unit along the axis 42 of the main drive mechanism 40.

To move the partial or complete assemblies from one assembly station to the next, two systems are used: first 12 to second 14 assembly station transfers being effected by a pushing apparatus of the type shown at 191 in FIGS. 1 and 2, acting in a direction substantially parallel with the workpiece support 150; second 14 to third 16 assembly station transfers being effected by a rotatable sprocket 180 on a horizontal support 182 beyond the third assembly station 16. The sprocket 180 may be tied through a drive train to the main drive mechanism 40 or independently driven so that the sprocket 180 indexes to pull the chain or partial assemblies from the second assembly station 14 to the third assembly station 16, after the second assembly station movable assembly mechanism 54 has operated on the chain workpieces, and after the third assembly station movable assembly mechanism 54 has operated on the chain workpiece, from the third assembly station 16 to a storage area.

Figure 9:
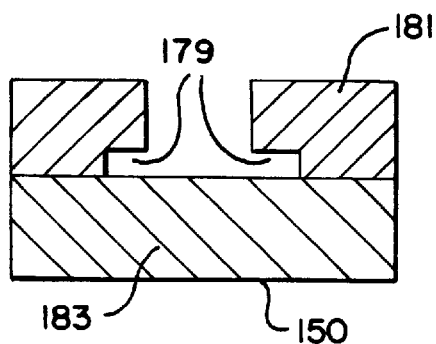
FIG. 9 is a cross-section taken along line 9—9 of FIG. 8.

Each locator unit 84 workpiece support 150 functions to provide a substantially continuous horizontal support for the workpieces between the ram 82 of each assembly station 12, 14, 16 and for the complete chain to the sprocket 180. As shown in FIGS. 7–9, in some assembly stations, the workpiece support 150 may also provide vertical supports or walls 181 to define an undercut channel 179 through which a bottom plate, such as a roller or pin link plate 20, 22 with upstanding pins 26 or bushings 24 maintained uprights by the vertical supports 181 assure proper positioning of partial or complete assembly of workpieces as it travels from one assembly station to the next. A continuous horizontal support 183 may lie beneath the vertical supports 181, as shown in FIGS. 7–9.

It should be understood that the shape of the support 150 will depend on the use of the apparatus. For example, it may be desirable to have such vertical supports 181 and undercuts along a substantial length of the apparatus, particularly if the apparatus is being used to assemble a roller link component for later assembly into a completed chain. For such an apparatus, the sprocket 180 would not be effective to pull the assemblies through from one station to the next, and the pushing apparatus 191 could be used to move the assemblies along the line. For such an apparatus, it may be desirable to use supports 150 of the type shown in FIG. 2 that define the path for the workpiece elements. Although the sprocket 180 is shown in that embodiment, it would not necessarily be used. For an apparatus being used to assemble a complete chain, it may be desirable to use locator units 84 having supports 150, with a substantial area between the second and third assembly stations 14, 16 being free from vertical supports 181, having only a horizontal support 183.

As shown in FIGS. 7–8, the workpiece supports 150 for adjacent assembly stations each have breaks 184 of complementary shapes to provide a continuous support for the assembly as it travels between the assembly stations. Other complementary shaped may be used, such as shown in FIG. 2. Each of the locator units 84 is removable by loosening the clamp 164 and lifting the locator unit 84 from the frame member 88 and drive lug 174.

As shown in FIG. 7, the locator unit 84 elements may be connected together or located by any suitable mechanical means, such as hex-socket head cap screws 185, or nuts and bolts 187. Location sensors 189 may also be carried on the locator units 84, with output fed to a programmable controller or computer 78.

The present invention also provides at least one removable alternate locator unit 190, as shown in FIG. 8, of substantially the same design as the top locator unit illustrated in FIG. 7, but with a workpiece support 150 of a different length. Thus, to make a different type of chain, one would remove at least one of the locator units from at least one of the assembly stations, move the assembly stations to the desired spacing, and replace the removed locator unit 84 with an alternate locator unit 190 having a workpiece support 150 of a different length, a length that will assure that a continuous support is provided between the assembly stations at the new spacing. The shape of the break 184 in the alternate locator unit support 150 should be similar to that of the removable locator unit, as seen from comparing FIGS. 7 and 8, to complement the shape of the break in the adjacent locator unit.

The assembler of the present invention may comprise a kit, with one or more removable and interchangeable alternate locator units 84, 190 provided, each having workpiece support lengths 150 and breaks 184 sized and shaped to mate with or abut the workpiece support of an adjacent locator unit at the various spacings. Thus, with one of the interchangeable alternate locator 84, 190 units in place, a continuous support path is provided for the workpieces between the three assembly stations when one of the assembly stations is at different positions with different distances between two of the assembly stations.

It should be understood that an alternate locator unit 190 may be provided for any one or all of the locator units 84 of FIG. 2 or FIG. 7. More than one set of alternate locator units may also be provided, depending on the variety of products to be made with the assembler. Each of the bridges 152 and workpiece supply lines 154 may also be removable and interchangeable with alternate structures that may be provided with a kit.

In the method of the present invention, roller chain products of different pitch may be made on a common assembly system apparatus 10. The method comprises the steps of providing first, second and third assembly stations 12, 14, 16. Each assembly station includes an assembly mechanism 54 and a drive train 56 for driving the assembly mechanism. A main drive mechanism 40 is provided for all three assembly stations 12, 14, 16. Each assembly station drive train 56 is connected to be driven by the main drive mechanism 40. The first, second and third assembly stations 12, 14, 16 are then positioned at a pre-determined spacing from each other and with the main drive mechanism 40 running along all three assembly stations by sliding a part of the drive train along the main drive mechanism 40 in a direction parallel to the central longitudinal axis 42 of the main drive mechanism 40.

In operation, appropriate supplies or workpieces are loaded into each of the supply lines 154 and the motor 52 is started. For a roller link assembly apparatus, the supply line 155 may be filled with stacked roller link plates 20, and the supply lines 154 to the first assembly station 12 filled with bushings 24. The supply line 154 at the second assembly station 14 may be filled with rollers 28, and the supply line 154 at the third assembly station 16 may be filled with a stack of roller link plates 20. The lateral feed mechanism 191 pushes the roller link plates 20 from the supply line 155 into the path of the ram, below the ram 82, and two bushings 24 are gravity fed into the path of the locator member 148. The motor 52, gear 50 and drive belt 48 cause the flywheel 46 to rotate, which causes one side of the clutch 44 to rotate, which in turn rotates the other side of the clutch 44 through friction or the like. Rotation of the clutch 44 causes the main drive mechanism 40 to rotate. As the main drive mechanism 40 rotates, the right angle gear boxes 62 cause each assembly station drive shaft 58 to rotate. As each assembly station drive shaft 58 rotates the rotatable cam 136 and barrel cam 168 of each assembly station rotates, moving each cam follower 134, 170, setting the remainders of the drive linkages in motion to move or allow the locator members 148 to move horizontally toward the ram 82, pushing the workpiece, such as the bushings 24, into the path of the ram hammer 92. Then, the drive linkages move the ram 82 vertically downward toward the locator members. Force is applied by the ram hammer 92 to two or more of the workpieces to force them together, such as pressing the bushings into the holes in the roller link plates. As the main drive mechanism 40 continues to rotate, the cams 136, 168 and cam followers 134, 170 move the ram 82 and locator members 148 away from each other and the pushing apparatus 191 pushes another plate 20 into position, which pushes the assembly toward the next assembly station. As the assembly moves, it is supported by the workpiece support 150: from the first to the second assembly station 12, 14, the upright bushings 24 are between the vertical supports 181 and the roller link plate 20 is in the undercut, supported by the continuous horizontal support 183. The workpiece comprising the roller link plate 20 and the upright bushings 24 is pushed toward the second assembly station 14 as the lateral feed mechanism 191 feeds another roller link plate 20 to the first assembly station. When the workpiece reaches the second assembly station, rollers 28 are gravity fed into the path of the second station locator member 148, which pushes the rollers into the path of the ram 82 through operation of the barrel cam 168, follower 170 and drive lug 174. The drive linkage for the ram forces the second assembly station ram down to push the rollers down into position on the bushings. Workpieces from the first assembly station push the workpieces from the second assembly station further down the line toward the third assembly station 16. At the third assembly station 16, another roller link plate 20 is gravity fed into the path of the locator member 148. As the main drive mechanism 40 rotates, turning the third assembly station drive shaft 58 and thereby rotating the barrel cam 168, the cam follower 170 moves toward the ram, moving the drive lug 174 and locator member 148 toward the ram, pushing the roller link plate onto the awaiting bushings 24 of the workpiece. The rotating third assembly station drive shaft 58 rotates the cam 136, and through the drive linkage, the third assembly station ram 82 pushes the roller link plate onto the bushings and press fits them together. The completed roller link is then pushed further down the line for storage.

For assembly of a complete chain, the locator units 84 shown in FIG. 2 could be removed and replaced with locator units of the type shown in FIG. 7. Each locator unit would be placed so that drive lug 174 is received to enable it to drive the locator member toward and away from the ram. The spacing of the assembly stations could be adjusted if needed, either manually or through computer control by the programmable computer 78. The supply lines 154, 155 could be changed to supply pin link plates 22 and pins 26 at the first station 12, roller link assemblies at the second station 14, and a top pin link plate 22 at the third station 16. Operation of each station would be similar to that described above, with the locator members 148 pushing pins at the first station, roller link assemblies at the second station 14, and top pin link plates at the third station. In this set up, the sprocket 180 would operate to pull the partially completed chain from the second assembly station 14 and the completed chain from the third assembly station 16.

It may be desirable to combine the present invention with that disclosed in the patent application filed concurrently herewith by David C. Armenoff and David J. Frey, and assigned to Amsted Industries, Inc. and entitled "Apparatus and Method for Control of Roller Chain Assembly", the disclosure of which is incorporated by reference herein in its entirety.

While only specific embodiments of the invention have been described and shown, those in the art should recognize that various modifications can be made thereto and alternatives used. In addition, it should be recognized that the present invention has applications beyond the illustrated environment. It is, therefore, the intention in the appended claims to cover all such modifications and alternatives and applications as may fall within the true scope of the invention.

We claim:

1. An assembly apparatus for assembling a product from workpieces comprising:

a main drive mechanism having a central longitudinal axis and being rotatable about its central longitudinal axis;

a first assembly station comprising:

a movable assembly mechanism to act on a workpiece, the movable assembly mechanism comprising a ram movable through a pre-determined path for applying force to the workpiece;

a first locator unit for moving workpiece elements into the path of the ram, the first locator unit being removably secured to the first assembly station;

a drive train between the moveable assembly mechanism and the main drive mechanism for moving the assembly mechanism in response to rotation of the main drive mechanism and including:

an assembly station drive shaft having a central longitudinal axis substantially perpendicular to the central longitudinal axis of the main drive mechanism; and means for rotating the assembly station drive shaft with rotation of the main drive mechanism;

a second assembly station spaced from the first assembly station and comprising:

a movable assembly mechanism to act on a workpiece received from the first assembly station, the second assembly station assembly mechanism comprising a second ram movable through a pre-determined path for applying force to the workpiece received from the first assembly station;

a second locator unit for moving the workpiece elements into the path of the ram, the second locator unit being removably secured to the second assembly station; and a drive train between the movable assembly mechanism and the main drive mechanism for driving the assembly mechanism in response to rotation of the main drive mechanism;

the first locator unit including a workpiece support member extending toward the second assembly station and having a first length;

the second locator unit including a workpiece support member extending toward the first assembly station;

the first and second workpiece support members meeting along a joint and providing a continuous support path for the workpieces between the first and second assembly stations;

wherein the first assembly station is movable with respect to the second assembly station in a direction parallel to the main drive mechanism central longitudinal axis between a plurality of positions, each position of the first assembly station being at a different spacing from the second assembly station to vary the distance between the assembly stations.

2. The assembly apparatus of claim 1 further comprising a third assembly station, wherein the second assembly station is positioned between the first and third assembly stations, the workpiece moving from the first assembly station and through the second assembly station to the third assembly station, the third assembly station comprising:

a movable assembly mechanism to act on the workpiece received from the second assembly station;

a drive train between the movable assembly mechanism and the main drive mechanism for driving the movable assembly mechanism in response to rotation of the main drive mechanism and including:

an assembly station drive shaft having a central longitudinal axis substantially perpendicular to the central longitudinal axis of the main drive mechanism;

means for rotating the assembly station drive shaft with rotation of the main drive mechanism;

wherein the third assembly station is movable with respect to the first and second assembly stations in a direction parallel to the main drive mechanism central longitudinal axis between a plurality of positions, each position of the third assembly station being at a different spacing from the first and second assembly stations.

3. The assembly apparatus of claim 1 further comprising means for moving the first assembly station away from the second assembly station.

4. The assembly apparatus of claim 3 wherein the means for moving the first assembly station away from the second assembly station comprises a threaded member extending between the first and second assembly stations.

5. The assembly apparatus of claim 1 wherein the main drive mechanism includes a shaft with a plurality of axial splines on the outer surface of the shaft and the means for rotating the assembly station drive shaft with rotation of the main drive mechanism contacts the axial splines and is movable relative to the axial splines in a direction parallel to the central longitudinal axis of the main drive mechanism.

6. The assembly apparatus of claim 5 wherein the shaft of the main drive mechanism comprises a common drive shaft extending between the first and second assembly stations.

7. The assembly apparatus of claim 5 wherein the main drive mechanism includes a sleeve receiving the shaft, the sleeve mating with the axial splines of the shaft and the sleeve and the shaft being movable with respect to each other.

8. The assembly apparatus of claim 1 wherein one of the locator units is removable from the assembly station and the apparatus comprises a kit having an alternate locator unit for one of the assembly stations, the alternate locator unit being interchangeable with the removable locator unit, the alternate locator unit including a workpiece support member sized and shaped to abut the workpiece support member of the adjacent assembly station when the assembly stations are at a different spacing.

9. An assembly apparatus for assembling a product from workpieces comprising:

a main drive mechanism having a central longitudinal axis and being rotatable about its central longitudinal axis;

a first assembly station comprising:

a movable assembly mechanism to act on a workpiece;

a drive train between the moveable assembly mechanism and the main drive mechanism for moving the assembly mechanism in response to rotation of the main drive mechanism and including:

an assembly station drive shaft having a central longitudinal axis substantially perpendicular to the central longitudinal axis of the main drive mechanism; and means for rotating the assembly station drive shaft with rotation of the main drive mechanism;

a second assembly station spaced from the first assembly station and comprising:

a movable assembly mechanism to act on a workpiece received from the first assembly station; and a drive train between the movable assembly mechanism and the main drive mechanism for driving the assembly mechanism in response to rotation of the main drive mechanism;

a third assembly station spaced from the first and second assembly stations and comprising:

a movable assembly mechanism to act on the workpiece received from the second assembly station;

a drive train between the movable assembly mechanism and the main drive mechanism for driving the movable assembly mechanism in response to rotation of the main drive mechanism and including:

an assembly station drive shaft having a central longitudinal axis substantially perpendicular to the central longitudinal axis of the main drive mechanism;

means for rotating the assembly station drive shaft with rotation of the main drive mechanism;

wherein the first assembly station is movable with respect to the second assembly station in a direction parallel to the main drive mechanism central longitudinal axis between a plurality of positions, each position of the first assembly station being at a different spacing from the second assembly station to vary the distance between the assembly stations;

wherein the third assembly station is movable with respect to the first and second assembly stations in a direction parallel to the main drive mechanism central longitudinal axis between a plurality of positions, each position of the third assembly station being at a different spacing from the first and second assembly stations; and wherein the second assembly station is positioned between the first and third assembly stations, the workpieces moving from the first assembly station and through the second assembly station to the third assembly station;

the assembly apparatus further comprising a threaded member extending between the first assembly station and the second assembly station and a threaded member extending between the third assembly station and the second assembly station for moving the first and third assembly stations with respect to the second assembly station by rotating the threaded members.

10. An assembly apparatus for assembling a product from workpieces comprising:

a main drive mechanism having a central longitudinal axis and being rotatable about its central longitudinal axis;

a first assembly station comprising:

a movable assembly mechanism to act on a workpiece;

a drive train between the moveable assembly mechanism and the main drive mechanism for moving the assembly mechanism in response to rotation of the main drive mechanism and including:

an assembly station drive shaft having a central longitudinal axis substantially perpendicular to the central longitudinal axis of the main drive mechanism; and means for rotating the assembly station drive shaft with rotation of the main drive mechanism;

a second assembly station spaced from the first assembly station and comprising:

a movable assembly mechanism to act on a workpiece received from the first assembly station; and a drive train between the movable assembly mechanism and the main drive mechanism for driving the assembly mechanism in response to rotation of the main drive mechanism;

wherein the first assembly station is movable with respect to the second assembly station in a direction parallel to the main drive mechanism central longitudinal axis between a plurality of positions, each position of the first assembly station being at a different spacing from the second assembly station to vary the distance between the assembly stations;

wherein the product comprises roller chain and the workpieces are selected from the group consisting of one or more pin link plates, one or more pins, one or more bushings, one or more rollers, one or more roller link plates, one or more assemblies of pin link plates and pins, one or more assemblies of bushings and roller link plates, one or more assemblies of bushings, rollers and roller link plates, and one or more assemblies of pin link plates, pins, bushings, rollers, and roller link plates.

11. The assembly apparatus of claim 10 wherein the pin link plate has two spaced apertures and the roller chain has a pitch related to the distance between the spaced apertures and the spacing of the assembly stations is related to the pitch of the chain.

12. An assembly system kit capable of assembling more than one product and comprising:

a main drive mechanism having a central longitudinal axis and being rotatable about its central longitudinal axis;

a first assembly station comprising:

a ram movable in a predetermined path for applying force to a workpiece;

a first assembly station locator unit having a locator member for moving a workpiece element toward the path of the ram and a workpiece support of one length;

a first assembly station drive shaft having a central longitudinal axis substantially perpendicular to the central longitudinal axis of the main drive mechanism;

means for rotating the first assembly station drive shaft with rotation of the main drive mechanism so that the rotational position of the assembly station drive shaft varies with the rotational position of the main drive mechanism;

a drive linkage between the first assembly station drive shaft and the ram to move the ram with rotation of the first assembly station drive shaft;

a drive linkage extending from the first assembly station drive shaft to move the locator member with rotation of the assembly station drive shaft;

a second assembly station spaced from the first assembly station to receive the workpiece from the first assembly station and comprising:

a ram movable in a predetermined path for applying force to a workpiece;

a second assembly station locator unit having a locator member for moving a workpiece element toward the path of the ram and a workpiece support of one length;

a second assembly station drive shaft having a central longitudinal axis substantially perpendicular to the central longitudinal axis of the main drive mechanism;

means for rotating the second assembly station drive shaft with rotation of the main drive mechanism so that the rotational position of the second assembly station drive shaft varies with the rotational position of the main drive mechanism;

a drive linkage between the second assembly station drive shaft and the ram to move the ram with rotation of the second assembly station drive shaft;

a drive linkage extending from the second assembly station drive shaft to move the locator member with rotation of the second assembly station drive shaft;

wherein the first assembly station is movable with respect to the second assembly station to a plurality of positions at different distances from the second assembly station, and wherein at a first position the second assembly station workpiece support abuts the first assembly station workpiece support to provide a continuous support path for the workpiece between the first assembly station and the second assembly station, at least one of the locator units being removable from the associated assembly station, the kit further including an alternate locator unit interchangeable with the removable locator unit on the assembly station, the alternate locator unit having a workpiece support sized and shaped to abut the adjacent locator unit workpiece support to provide a continuous support path for the workpiece between the two assembly stations when one of the assembly stations is at another position with a different distance between the assembly stations.

13. The assembly system kit of claim 12 wherein the means for rotating the first assembly station drive shaft with rotation of the main drive mechanism is movable in a direction substantially perpendicular to the central longitudinal axis of the first assembly station drive shaft.

14. The assembly system kit of claim 12 further comprising means for changing the spacing between the first assembly station and the second assembly station.

15. The assembly system kit of claim 14 wherein the means for changing the spacing between the first assembly station and the second assembly station comprises a threaded member extending between the first and second assembly stations.

16. The assembly system kit of claim 12 further comprising a third assembly station spaced from the first assembly station and second assembly station and receiving the workpiece from the second assembly station and comprising:

a third assembly station spaced from the first assembly station and second assembly station and receiving the workpiece from the second assembly station and comprising:

a ram movable in a predetermined path for applying force to a workpiece;

a third assembly station locator unit having a locator member for moving a workpiece element toward the path of the ram and a workpiece support of one length;

a third assembly station drive shaft having a central longitudinal axis substantially perpendicular to the central longitudinal axis of the main drive mechanism;

means for rotating the third assembly station drive shaft with rotation of the main drive mechanism so that the rotational position of the third assembly station drive shaft varies with the rotational position of the main drive mechanism;

a drive linkage between the third assembly station drive shaft and the ram to move the ram with rotation of the third assembly station drive shaft;

a drive linkage extending from the third assembly station drive shaft to move the locator member with rotation of the third assembly station drive shaft;

wherein the first and third assembly stations are movable with respect to the second assembly station to a plurality of positions at different distances from the second assembly station, and wherein at a first position the second assembly station workpiece support abuts the first assembly station workpiece support and the third assembly station workpiece support to provide a continuous support path for the workpiece between the second assembly station and the first and third assembly stations, a second locator unit being removable from the associated assembly station, the kit further including another alternate locator unit interchangeable with the second removable locator unit on the assembly station, the alternate locator unit having a workpiece support sized and shaped to abut the adjacent locator unit workpiece support to provide a continuous support path for the workpiece between the three assembly stations when one of the assembly stations is at another position with a different distance between two of the assembly stations.

17. The assembly system kit of claim 16 further comprising a base supporting the first, second and third assembly stations and wherein the second assembly station remains stationary on the base and the first and third assembly stations are movable on the base.

18. The assembly system kit of claim 12 wherein the product comprises roller chain and the workpieces are selected from the group consisting of one or more pin link plates, one or more pins, one or more bushings, one or more rollers, one or more roller link plates, one or more assemblies of pin link plates and pins, one or more assemblies of bushings and roller link plates, one or more assemblies of bushings, rollers and roller link plates, and one or more assemblies of pin link plates, pins, bushings, rollers, and roller link plates.

19. The assembly system kit of claim 18 wherein the pin link plate has two spaced apertures and the roller chain has a pitch related to the distance between the spaced apertures and the spacing of the assembly stations is related to the pitch of the chain.

20. A method of assembling a product from workpieces comprising:

providing a main drive mechanism having a central longitudinal axis and being rotatable about its central longitudinal axis;

providing a first assembly station including a movable assembly mechanism to act on a workpiece and a drive train between the moveable assembly mechanism and the main drive mechanism for moving the assembly mechanism in response to rotation of the main drive mechanism and including:

an assembly station drive shaft having a central longitudinal axis substantially perpendicular to the central longitudinal axis of the main drive mechanism; and means for rotating the assembly station drive shaft with rotation of the main drive mechanism;

providing a second assembly station spaced from the first assembly station, the second assembly station having a movable assembly mechanism to act on a workpiece received from the first assembly station; and a drive train between the moveable assembly mechanism and the main drive mechanism for driving the assembly mechanism in response to rotation of the main drive mechanism and including:

an assembly station drive shaft having a central longitudinal axis substantially perpendicular to the central longitudinal axis of the main drive mechanism; and means for rotating the assembly station drive shaft with rotation of the main drive mechanism;

wherein at least one assembly station is movable with respect to the other assembly station in a direction parallel to the main drive mechanism central longitudinal axis between a plurality of positions, each position of the movable assembly station being at a different spacing from the other assembly station to vary the distance between the assembly stations;

the method including moving one of the assembly stations to a predetermined position by moving a part of the drive train of the movable assembly station along the main drive mechanism, assembling two workpieces at the first assembly station, moving the assembled workpieces to the second assembly station, and assembling another workpiece with the workpiece assembly received from the first assembly station at the second assembly station;

wherein the product comprises roller chain and the workpieces are selected from the group consisting of one or more pin link plates, one or more pins, one or more bushings, one or more rollers, one or more roller link plates, one or more assemblies of pin link plates and pins, one or more assemblies of bushings and roller link plates, one or more assemblies of bushings, rollers and roller link plates, and one or more assemblies of pin link plates, pins, bushings, rollers, and roller link plates.

21. The method of claim 20 wherein the first assembly station movable assembly mechanism comprises a ram movable in a pre-determined path for applying force to one of the workpieces and a movable locator unit, wherein the second assembly station movable assembly mechanism comprises a ram movable in a pre-determined path for applying force to one of the workpieces and a locator unit having a locator member for moving a workpiece element toward the path of the ram, wherein the step of assembling two workpieces at the first assembly station comprises moving a roller link plate into a position below the ram, the roller link plate having a pair of spaced holes, moving a pair of bushings with the locator member toward the ram and toward the roller link plate and moving the ram down to press the bushings into the holes of the roller link plate; and wherein the step of assembling a third workpiece with the assembly received from the first assembly station at the second assembly station comprises moving a pair of rollers with the locator member toward the ram and an assembly of a roller link plate and press-fit bushings and moving the ram down to push the rollers onto the bushings.

22. The method of claim 21 further comprising the step of providing a third assembly station spaced from the first and second assembly stations, the third assembly station having a movable assembly mechanism to act on a workpiece received from the second assembly station, the movable assembly mechanism including a ram movable through a predetermined path for applying force to the workpiece, the third assembly station further including a third locator unit with a locator element for moving a workpiece into the path of the ram and a drive train between the movable assembly mechanism and the main drive mechanism for moving the ram of the third assembly mechanism through its predetermined path in response to rotation of the main drive mechanism;

wherein the third assembly mechanism is movable with respect to the second assembly station in a direction parallel to the main drive mechanism central longitudinal axis between a plurality of positions, each position of the third assembly station being at a different spacing from the second assembly station;

wherein the workpieces at the third assembly station include a roller link plate and an assembly received from the second assembly station comprising a roller link plate, two press-fit bushings and two rollers on the bushings;

the method further including the steps of:

moving another of the assembly stations to a predetermined position by moving a part of the drive train of the movable assembly station along the main drive mechanism; and moving one assembly of a roller link plate, press-fit bushings and rollers from the second assembly station to a position below the ram of the third assembly station, moving another roller link plate with the locator member toward the ram and moving the ram down to press the roller link plate onto the bushings of the assembly of roller link plate, press-fit bushings and rollers to form a roller link assembly.

23. The method of claim 20 wherein the first assembly station movable assembly mechanism comprises a ram movable in a pre-determined path for applying force to one of the workpieces and a movable locator unit having a locator member for moving a workpiece into the path of the ram, wherein the second assembly station movable assembly mechanism comprises a ram movable in a pre-determined path for applying force to one of the workpieces and a locator unit having a locator member for moving a workpiece element toward the path of the ram, wherein the step of assembling two workpieces at the first assembly station comprises moving a pin link plate into a position below the ram, the pin link plate having a pair of spaced holes, moving a pair of pins with the locator member toward the ram and toward the pin link plate and moving the ram down to press the pins into the holes of the pin link plate; and wherein the third workpiece comprises a roller link assembly comprising a pair of roller link plate, a pair of bushings and a pair of rollers and wherein the step of assembling a third workpiece with the assembly received from the first assembly station at the second assembly station comprises moving a roller link assembly with the locator member toward the ram and two adjacent assemblies of a pin link plate and press-fit pins and moving the ram down to push the roller link assembly onto the pins of the two adjacent assemblies.

24. The method of claim 21 further comprising the step of providing a third assembly station spaced from the first and second assembly stations, the third assembly station having a movable assembly mechanism to act on a workpiece received from the second assembly station, the movable assembly mechanism including a ram movable through a predetermined path for applying force to the workpiece, the third assembly station further including a third locator unit with a locator element for moving a workpiece into the path of the ram and a drive train between the movable assembly mechanism and the main drive mechanism for moving the ram of the third assembly mechanism through its pre-determined path in response to rotation of the main drive mechanism;

wherein the third assembly mechanism is movable with respect to the second assembly station in a direction parallel to the main drive mechanism central longitudinal axis between a plurality of positions, each position of the third assembly station being at a different spacing from the second assembly station;

wherein the workpieces at the third assembly station include a pin link plate and an assembly received from the second assembly station comprising a pin link plate, two pins press fit into the holes of the pin link plate, one roller link assembly on one pin, and one roller link assembly on the other pin;

the method further including the steps of:

moving another of the assembly stations to a predetermined position by moving a part of the drive train of the movable assembly station along the main drive mechanism; and moving one assembly of a pin link plate, two pins press fit into the holes of the pin link plate, one roller link assembly on one pin, and one roller link assembly on the other pin from the second assembly station to a position below the ram of the third assembly station, moving another pin link plate with the locator member of the third assembly station toward the ram and moving the ram down to press the pin link plate onto the pins of the assembly of a pin link plate, two pins press fit into the holes of the pin link plate, one roller link assembly on one pin, and one roller link assembly on the other pin to assemble a segment of roller chain.

25. A method of assembling a product having a pitch from workpieces comprising the steps of:

providing first and second assembly stations, each assembly station including an assembly mechanism and a drive train for driving the assembly mechanism;

providing a main drive mechanism for both assembly stations, the main drive mechanism having a central longitudinal axis and being rotatable about the central longitudinal axis;

connecting each assembly station drive train to be driven by the main drive mechanism;

positioning the first and second assembly stations at a pre-determined spacing from each other by moving a part of the drive train of one of the assembly stations in a direction parallel to the central longitudinal axis of the main drive mechanism;

wherein each assembly mechanism comprises a ram movable in a pre-determined path for applying force to a workpiece and an assembly station locator unit having a locator member for moving a workpiece element toward the path of the ram and a workpiece support of one length, wherein one of the locator units is removable from the assembly station, the method further comprising the steps of:

providing a removable alternate locator unit interchangeable with the removable locator unit on the assembly station, the alternate locator unit having a workpiece support having a length different from the length of the workpiece support of the removable locator unit;

spacing the first and second assembly stations at a pre-selected distance;

selecting between the removable and the alternate locator unit the one having a length appropriate to abut an adjacent workpiece support; and securing the selected locator unit to the assembly station.

26. The method of claim 25 wherein the assembly system is to be used to produce a different pitch of product, the method further comprising the steps of:

removing the removable locator unit;

repositioning one of the assembly stations by sliding a part of the drive train along the main drive mechanism; and replacing the removed locator unit with another locator unit.

27. The method of claim 25 wherein the product comprises roller chain and wherein the workpieces are selected from the group consisting of one or more pin link plates, one or more pins, one or more bushings, one or more rollers, one or more roller link plates, one or more assemblies of pin link plates and pins, one or more assemblies of bushings and roller link plates, one or more assemblies of bushings, rollers and roller link plates, and one or more assemblies of pin link plates, pins, bushings, rollers, and roller link plates.

* * * * *